(12) United States Patent
Jayaraman et al.

(10) Patent No.: US 11,080,588 B2
(45) Date of Patent: *Aug. 3, 2021

(54) MACHINE LEARNING WITH PARTIAL INVERSION

(71) Applicant: ServiceNow, Inc., Santa Clara, CA (US)

(72) Inventors: Baskar Jayaraman, Fremont, CA (US); Aniruddha Thakur, Saratoga, CA (US); Kannan Govindarajan, Sunnyvale, CA (US)

(73) Assignee: ServiceNow, Inc., Santa Clara, CA (US)

( * ) Notice: Subject to any disclaimer, the term of this patent is extended or adjusted under 35 U.S.C. 154(b) by 901 days.

This patent is subject to a terminal disclaimer.

(21) Appl. No.: 15/786,177

(22) Filed: Oct. 17, 2017

(65) Prior Publication Data
US 2018/0107920 A1 Apr. 19, 2018

Related U.S. Application Data

(60) Provisional application No. 62/409,074, filed on Oct. 17, 2016.

(51) Int. Cl.
*G06N 3/04* (2006.01)
*G06N 3/08* (2006.01)
(Continued)

(52) U.S. Cl.
CPC .......... *G06N 3/0445* (2013.01); *G06F 17/10* (2013.01); *G06F 17/11* (2013.01); *G06N 3/08* (2013.01); *G06N 20/00* (2019.01)

(58) Field of Classification Search
CPC ........ G06N 3/0445; G06N 20/00; G06N 3/08; G06F 17/10; G06F 17/11
See application file for complete search history.

(56) References Cited

U.S. PATENT DOCUMENTS 6,609,122 B1 8/2003 Ensor
6,678,887 B1 1/2004 Hallman
(Continued)

OTHER PUBLICATIONS

Inverse Function, Wikipedia, Dec. 20, 2017 (downloaded from public web site https://en.wikipedia.org/wiki/Inverse_function).
(Continued)

*Primary Examiner* — Luis A Sitiriche
*Assistant Examiner* — Casey R. Garner
(74) *Attorney, Agent, or Firm* — Fletcher Yoder PC

(57) ABSTRACT

An example embodiment may involve a machine learning model representing relationships between a dependent variable and a plurality of n independent variables. The dependent variable may be a function of the n independent variables, where the n independent variables are measurable characteristics of computing devices, and where the dependent variable is a predicted behavior of the computing devices. The embodiment may also involve obtaining a target value of the dependent variable, and separating the n independent variables into n−1 independent variables with fixed values and a particular independent variable with an unfixed value. The embodiment may also involve performing a partial inversion of the function to produce a value of the particular independent variable such that, when the function is applied to the value of the particular independent variable and the n−1 independent variables with fixed values, the dependent variable is within a pre-defined range of the target value.

19 Claims, 11 Drawing Sheets

(51) Int. Cl.
    *G06F 17/10*    (2006.01)
    *G06F 17/11*    (2006.01)
    *G06N 20/00*    (2019.01)

(56) References Cited

U.S. PATENT DOCUMENTS

| | | |
|---|---|---|
| 6,816,898 B1 | 11/2004 | Scarpelli |
| 7,020,706 B2 | 3/2006 | Cates |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,610,512 B2 | 10/2009 | Gerber |
| 7,617,073 B2 | 11/2009 | Trinon |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidari |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,190,406 B2 | 5/2012 | Beckman et al. |
| 8,224,683 B2 | 7/2012 | Manos |
| 8,266,096 B2 | 9/2012 | Navarrete |
| 8,402,127 B2 | 3/2013 | Solin |
| 8,457,928 B2 | 6/2013 | Dang |
| 8,478,569 B2 | 7/2013 | Scarpelli |
| 8,612,408 B2 | 12/2013 | Trinon |
| 8,674,992 B2 | 3/2014 | Poston |
| 8,689,241 B2 | 4/2014 | Naik |
| 8,743,121 B2 | 6/2014 | De Peuter |
| 8,832,652 B2 | 9/2014 | Mueller |
| 8,887,133 B2 | 11/2014 | Behnia |
| 8,983,982 B2 | 3/2015 | Rangarajan |
| 9,065,783 B2 | 6/2015 | Ding |
| 9,098,322 B2 | 8/2015 | Apte |
| 9,122,552 B2 | 9/2015 | Whitney |
| 9,239,857 B2 | 1/2016 | Trinon |
| 9,317,327 B2 | 4/2016 | Apte |
| 9,363,252 B2 | 6/2016 | Mueller |
| 9,508,051 B2 | 11/2016 | Falk |
| 9,535,674 B2 | 1/2017 | Cooper |
| 9,535,737 B2 | 1/2017 | Joy |
| 9,557,969 B2 | 1/2017 | Sharma |
| 9,601,000 B1 | 3/2017 | Gruss et al. |
| 9,645,833 B2 | 5/2017 | Mueller |
| 9,654,473 B2 | 5/2017 | Miller |
| 9,766,935 B2 | 9/2017 | Kelkar |
| 9,792,387 B2 | 10/2017 | George |
| 9,805,322 B2 | 10/2017 | Kelkar |
| 9,819,729 B2 | 11/2017 | Moon |
| 2003/0093514 A1 | 5/2003 | Valves et al. |
| 2005/0240311 A1 | 10/2005 | Rabitz |
| 2006/0241901 A1 | 10/2006 | Hanus et al. |
| 2007/0220958 A1 | 9/2007 | Gotthard |
| 2009/0281981 A1 | 11/2009 | Chen et al. |
| 2010/0030734 A1 | 2/2010 | Chunilal |
| 2010/0192228 A1 | 7/2010 | Levi |
| 2016/0080203 A1* | 3/2016 | Narasimhan ............ H04L 67/28 709/221 |
| 2016/0086345 A1 | 3/2016 | Kuo |
| 2016/0099963 A1* | 4/2016 | Mahaffey ............ H04L 63/0227 726/25 |
| 2017/0006135 A1* | 1/2017 | Siebel .................... G06N 5/003 |
| 2017/0126712 A1* | 5/2017 | Crabtree ............ H04L 63/1425 |
| 2017/0262818 A1 | 9/2017 | Horrell |

OTHER PUBLICATIONS

Rodrigo de Salvo Braz, Eyal Amir, and Dan Roth, MPE and Partial Inversion in Lifted Probabilistic Variable Elimination, Proceedings of AAAI '06 (Twenty-first National Conference on Artificial Intelligence), Jul. 2006.
Parish, Eric J., and Karthik Duraisamy. "A paradigm for data-driven predictive modeling using field inversion and machine learning." Journal of Computational Physics 305 (2016): 758-77 4. (Year: 2016).
Hussain, Mohamed Azlan, Paisan Kittisupakorn, and Wachira Daosu. "Implementation of neural-network-based inverse-model control strategies on an exothermic reactor." Science Asia 27 (2001): 41-50 (Year: 2001).
Wermuth, Nanny, et al. "Partial inversion for linear systems and partial closure of independence graphs." BIT Numerical Mathematics. (Year: 2003) vol. 43, No. 1, pp. 001-018.
Extended European Search Report for European Application No. 18198152.3 dated Feb. 15, 2019; 17 pgs.

* cited by examiner

MACHINE LEARNING WITH PARTIAL INVERSION

CROSS-REFERENCE TO RELATED APPLICATION

This application claims priority to U.S. provisional patent application No. 62/409,074, filed Oct. 17, 2016, which is hereby incorporated by reference in its entirety.

BACKGROUND

Machine learning techniques can be used to predict an output value (formally, a dependent variable value) from a plurality of input values (formally, independent variable values). Such a machine learning model, often referred to as a supervisory learning model, may be trained with a data set that maps combinations of input values to known output values. Once trained, the model can be applied to further inputs in order to predict the corresponding output values. But these conventional machine learning models cannot be used to predict which ranges of input values may result in a particular output value.

SUMMARY

A machine learning model can be used to represent relationships between input values and output values of a system. With a large enough data set that maps sets of input values to particular output values, appropriate output values can be predicted for new combinations of input values.

In enterprise networking or software application hosting environments, machine learning can be used to determine relationships between the measured states of devices on a network and the likelihood that a particular event (desired or undesired) is going to occur. For instance, suppose that a web server device receives requests from client devices, and queries a separate database device to fulfill these requests. The database device may contain, as an example, certain pieces of information contained in web pages provided by the server, where the information to query is determined at least in part by the requests. Once the information is obtained by the web server device, it may construct an appropriate web page incorporating the information and transmit this web page to the client device.

In order to monitor the health of the service, various key performance indicators (KPIs) related to the web server device and the database device may be measured. For sake of simplicity, two of these KPIs may be relevant in this example: requests per second received at the web server device, and processor utilization at the database device. These two KPIs may be queried periodically or from time to time—for instance, once per minute.

After some number of queries have taken place (e.g., a few hundred or a few thousand), this data may be correlated with reported outages of the web service. A supervised machine learning model may be constructed that represents the relationship between requests per second at the web server device, processor utilization at the database device, and the likelihood of an outage at the web service. As an example, it may be determined that this likelihood for a given time frame (e.g., an hour) is relatively small (e.g., less than 2%) unless the requests per second exceed 100 and the processor utilization exceeds 70%. When these KPIs take on those values, the likelihood of an outage increases to over 30%.

While this model is helpful, it cannot easily be used in a proactive manner. It can be used to predict the likelihood of an outage based on current KPI measurements, but the model is unable to proactively indicate the range of requests per second that will make the likelihood of an outage remain below 5% if the processor utilization is 80%, for example.

The embodiments herein involve partial inversions of machine learning models. Instead of predicting an output value based on a set of input values, the inverted model allows specification of a particular output value and all but one of the input values. The model provides one or more values for the remaining input that will result in the particular output value, or something close thereto, being achieved. This affords the ability to proactively determine when the particular output value is likely to occur, so that actions can be taken to change one or more physical characteristics related to the input values. In this way, the particular output value may either be achieved or avoided.

Accordingly, a first example embodiment may involve one or more computing devices disposed within a computational instance of a remote network management platform. The computational instance may be dedicated to a remote network managed by the remote network management platform. The first example embodiment may also involve a machine learning model representing relationships between a dependent variable and a plurality of n independent variables, where the dependent variable is a function of the n independent variables. The n independent variables may be measurable characteristics of the one or more computing devices, and the dependent variable may be a predicted behavior of the one or more computing devices. The first example embodiment may also involve a computing device including a processor and memory, where the computing device is disposed within the remote network management platform, and where execution, by the processor, of program instructions stored in the memory causes the computing device to perform operations comprising: obtaining a target value of the dependent variable, separating the n independent variables into n−1 independent variables with fixed values and a particular independent variable with an unfixed value, performing a partial inversion of the function to produce one or more values of the particular independent variable such that, when the function is applied to any of the one or more values of the particular independent variable and the n−1 independent variables with fixed values, the dependent variable is within a pre-defined range of the target value of the dependent variable, and providing the one or more values of the particular independent variable for display or to another software application executing within the remote network management platform.

A second example embodiment may involve determining a machine learning model representing relationships between a dependent variable and a plurality of n independent variables, where the dependent variable is a function of the n independent variables. The n independent variables may be measurable characteristics of one or more computing devices of a remote network management platform. The dependent variable may be a predicted behavior of the one or more computing devices. The second example embodiment may also involve obtaining a target value of the dependent variable. The second example embodiment may also involve separating the n independent variables into n−1 independent variables with fixed values and one particular independent variable with an unfixed value. The second example embodiment may also involve performing a partial inversion of the function to produce one or more values of the particular independent variable such that, when the function is applied to any of the one or more values of the particular independent variable and the n−1 independent variables with fixed values, the dependent variable is within a pre-defined range of the target value of the dependent variable. The second example embodiment may also involve providing the one or more values of the particular independent variable for display or to a software application executing within the remote network management platform.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a system may include various means for carrying out each of the operations of the first and/or second example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
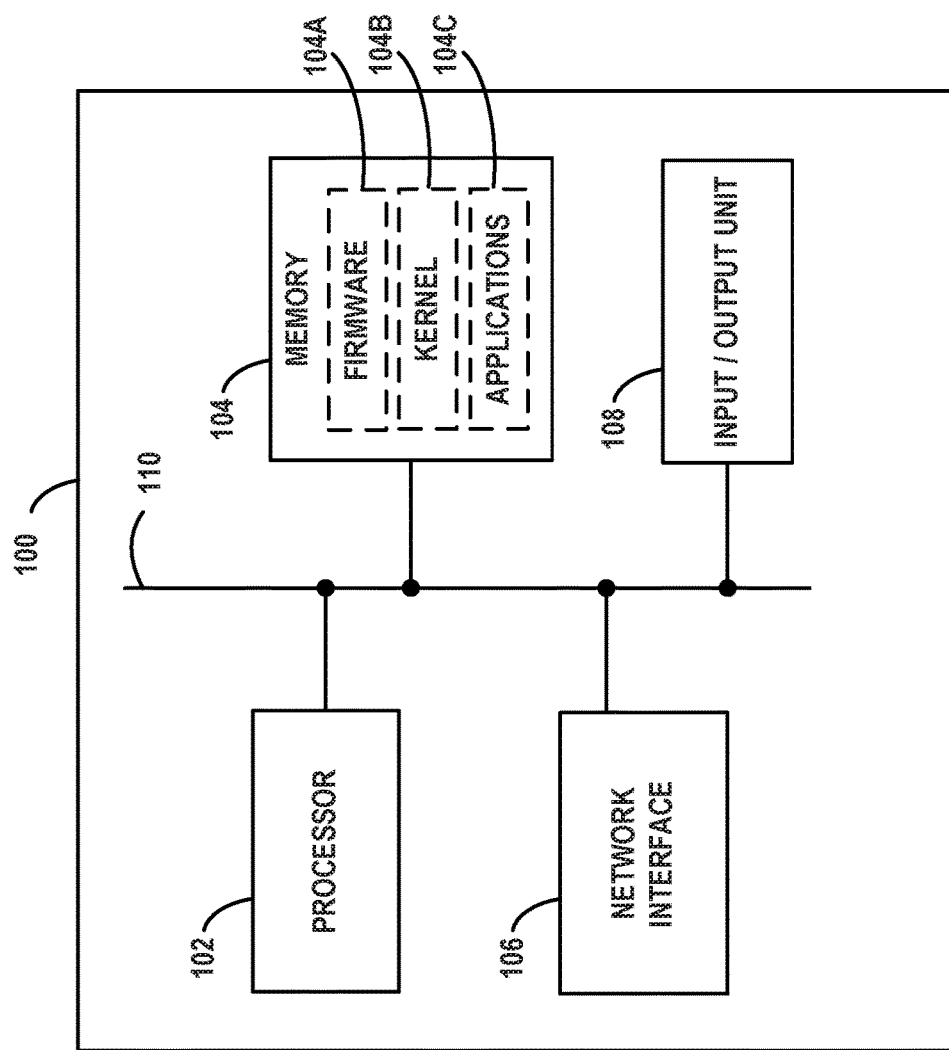
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality.

Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
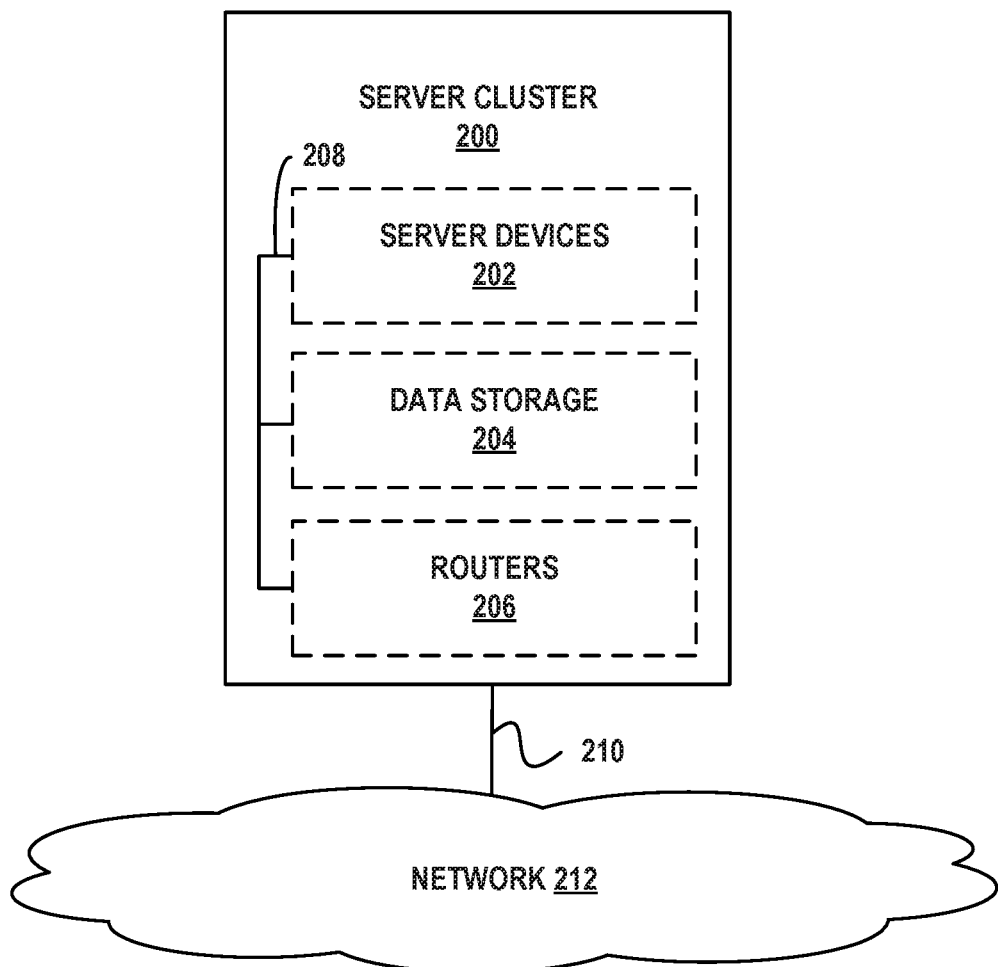
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
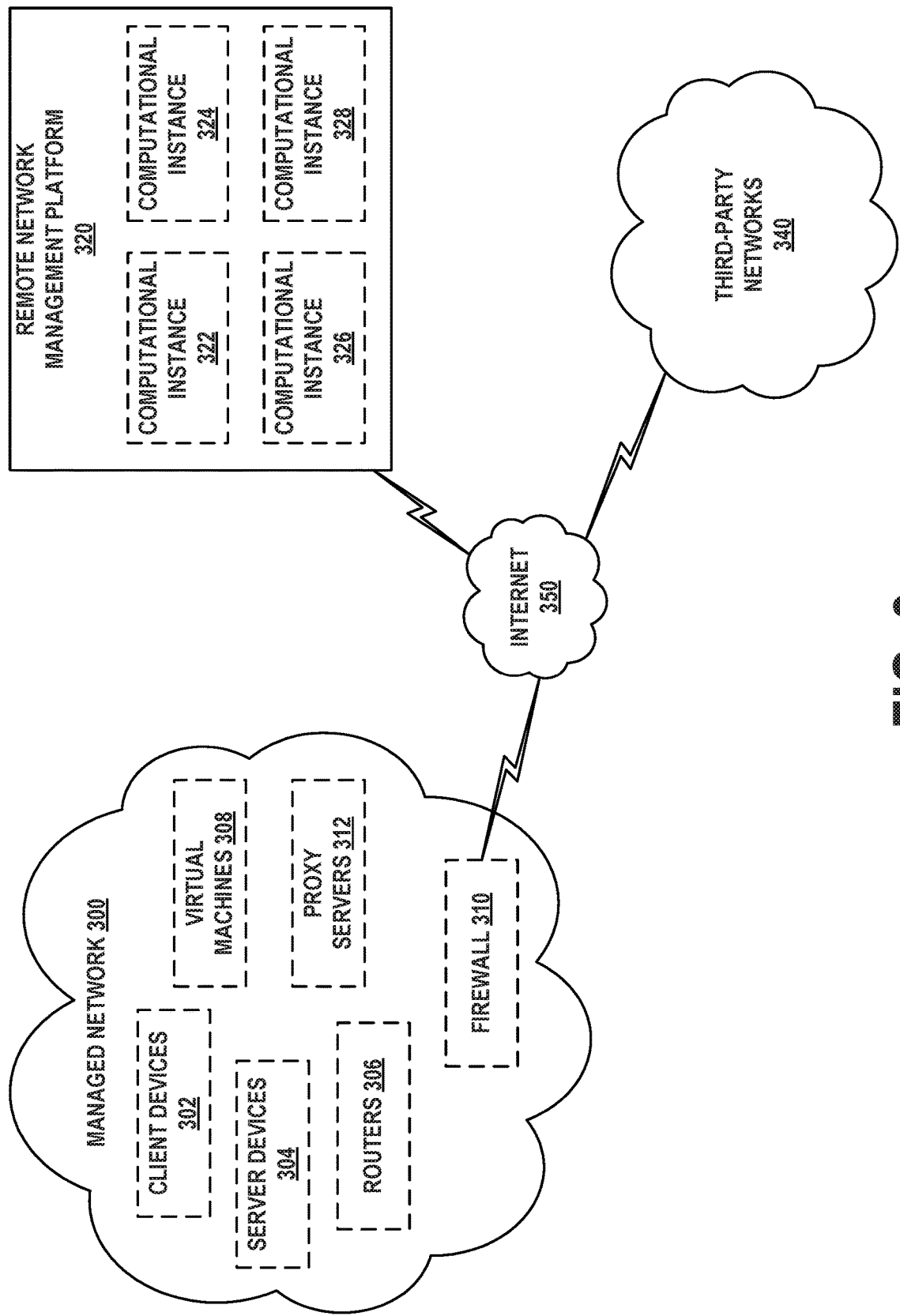
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
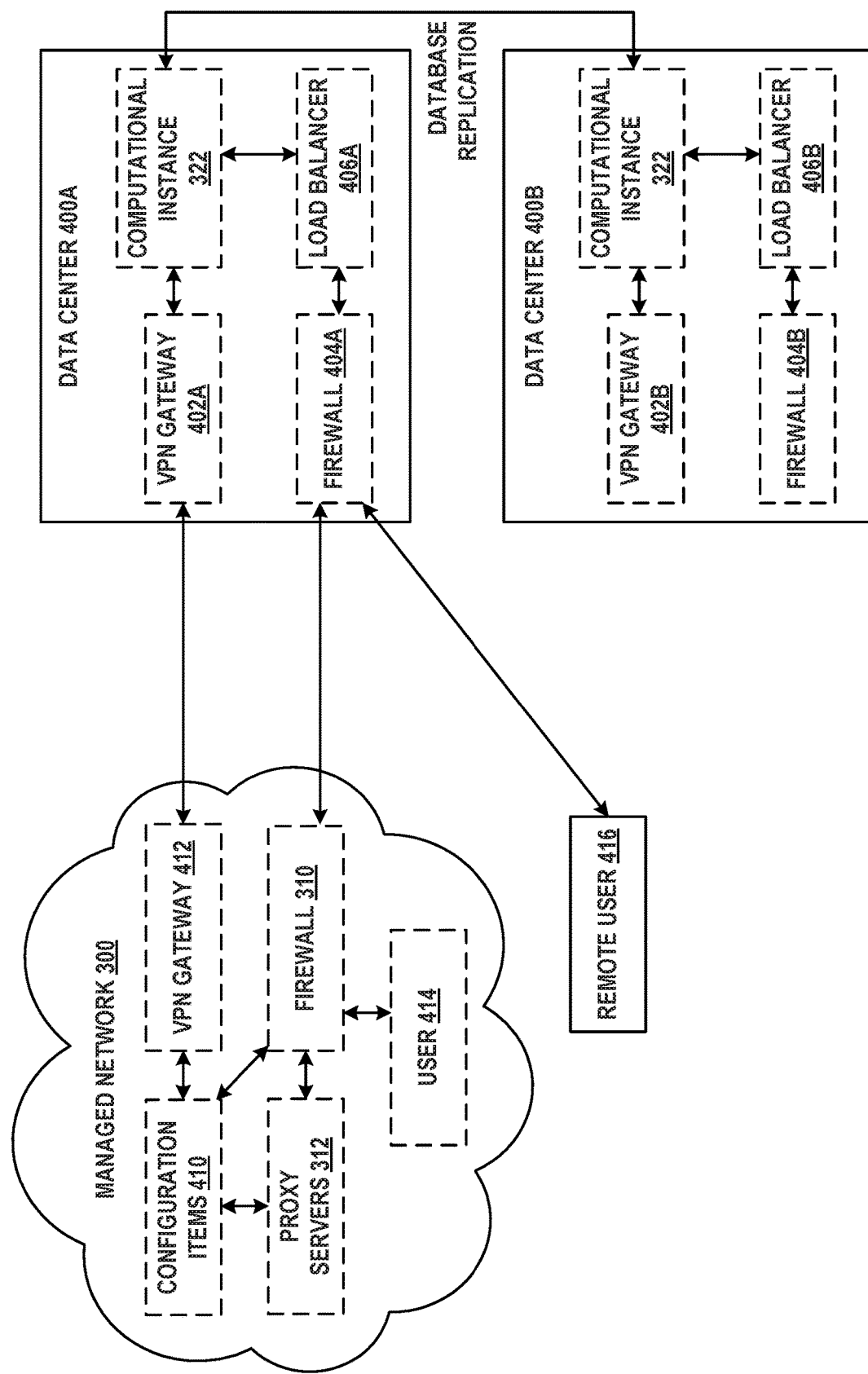
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
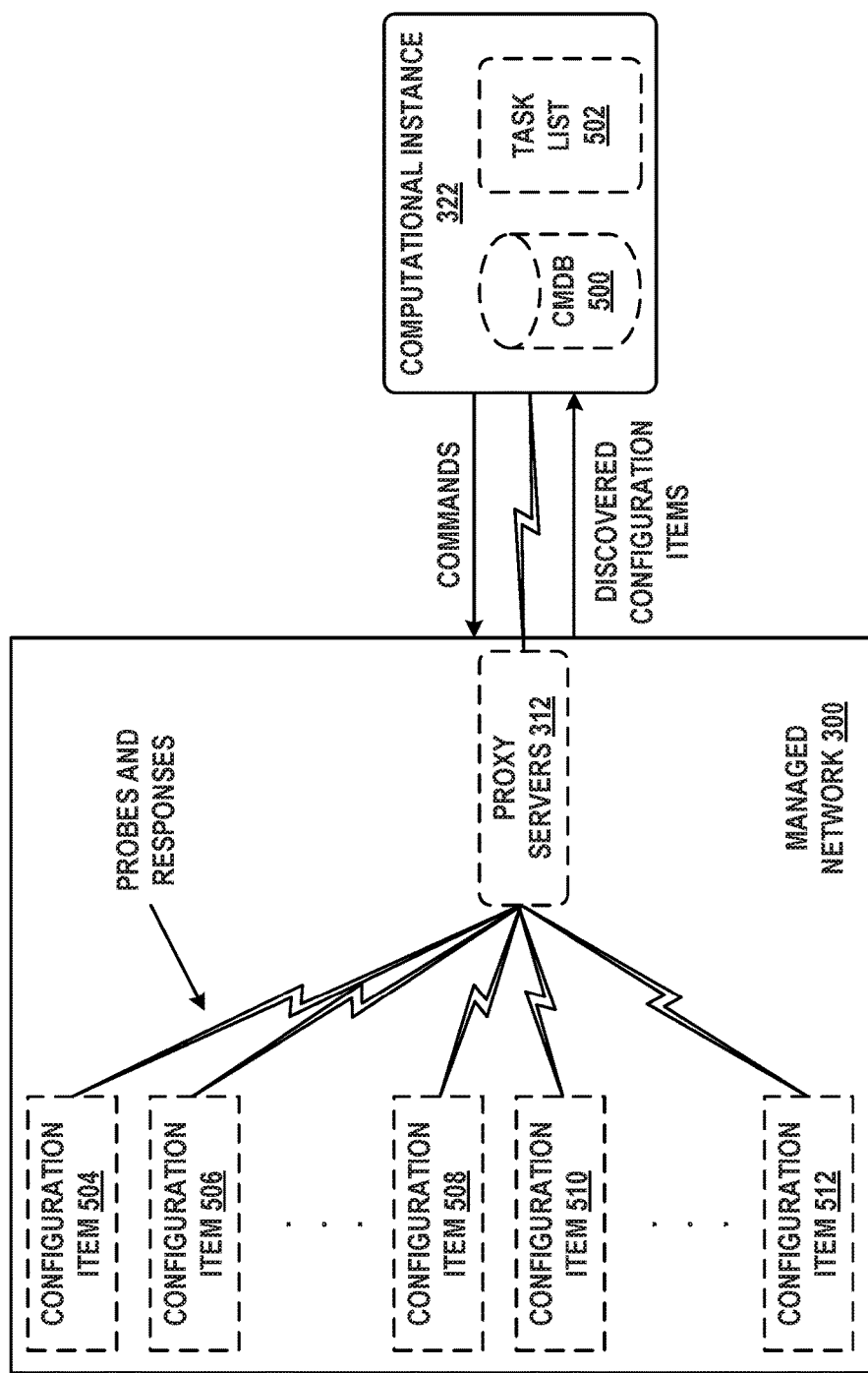
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
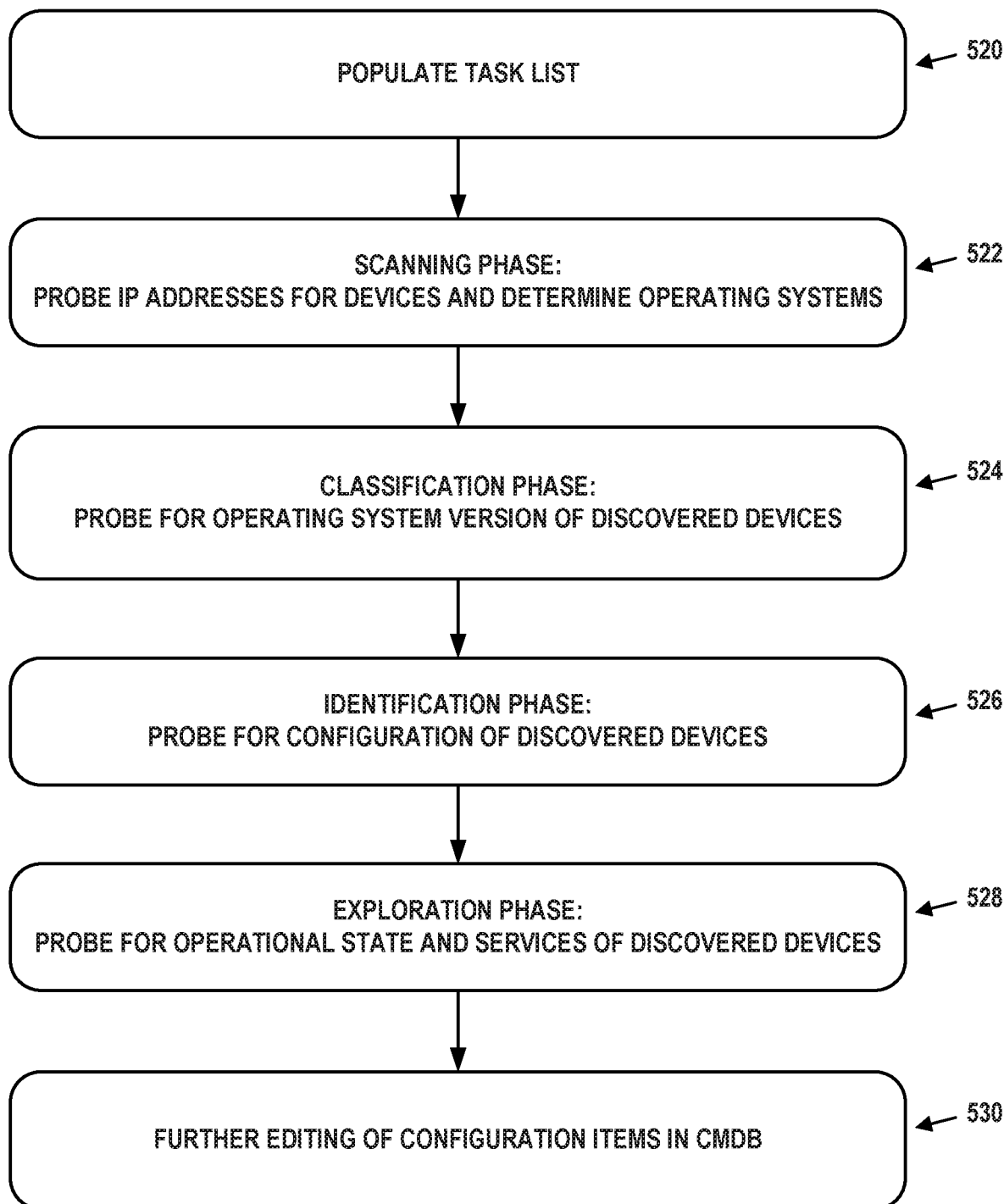
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Machine Learning with Partial Inversion in a Remote Network Management Platform The remote network management platform described in the previous sections is a complex system providing an array of services to multiple enterprises by way of their respective computational instances. Thus, it is desirable for the devices, applications, and services of the remote network management platform to be available and to perform in the expected manner. An outage can impact hundreds or thousands of users, potentially preventing them from carrying out mission-critical tasks. Thus, any way of being able to proactively avoid even just some outages would be a significant improvement to the reliability of the platform as a whole.

Machine learning models using partial inversion can be used to proactively avoid a multitude of problems in this sort of environment. Particularly, the models described herein can be used to identify when an independent variable representing a characteristic of the remote network management platform is at or trending toward a value that is likely, when combined with known values of the other such independent variables, to result in an outage, crash, or some other undesirable behavior.

A. Partial Inversion Defined

Formally, a system (or part of a system) may have n input values $x_1, x_2, \ldots, x_n$ that influence a particular output value of interest, y. The goal of a conventional machine learning model is to determine a function $f$ such that $y=f(x_1, x_2, \ldots, x_n)$. More formally, $x_1, x_2, \ldots, x_n$ are independent variables, y is a dependent variable, and $f$ provides a predicted value of y based on $x_1, x_2, \ldots, x_n$.

The quality of this prediction may be based on the quality of training data used to construct $f$. As noted above, the independent and dependent variables may be measured and the model may be constructed in a supervised fashion. That is, each input vector $X_i = \{x_{i,1}, x_{i,2}, \ldots, x_{i,n}\}$ and associated output $y_i$ contributes a data point in a space of n+1 dimensions. When this space is populated to a sufficient fashion (e.g., with hundreds, thousands, or millions of points depending on n and the ranges of the independent and dependent variables), the resulting model can be used to predict values of the dependent variable for a wide variety of independent variable values.

The machine learning model may be a regression-based model (linear or polynomial), a decision tree, a random forest of decision trees, a neural network, or some other type of model. In any of these cases, a closed-form expression of $f$ need not be found—instead the model extrapolates a dependent variable value from new instances of independent variable values. Additionally, in cases where there are multiple dependent variables of interest, multiple models may be constructed, one for each dependent variable. Furthermore, although the input variables are referred to herein an "independent" variables, they need not actually be independent of one another. This terminology is used for purpose of convenience and formality.

A partial inversion of such a model takes place when the dependent variable and n−1 of the independent variables are known, and the goal is to explore how the remaining independent variable impacts the dependent variable. Thus, the partial inversion can be characterized as $x_n = f^{-1}(x_1, x_2, \ldots, x_{n-1}, y)$. This equation assumes, without loss of generality, that $x_n$ is the dependent variable of interest, but the techniques described herein also can be applied when any of the other dependent variables, $x_1, x_2, \ldots, x_{n-1}$ are of interest.

In some embodiments, this characterization may be generalized so that n−k of the independent variables are known and k are unknown. The goal, in these cases, is to find values of the k unknown independent variables such that $y=f(x_1, x_2, \ldots, x_n)$. The following examples assume that k=1 in order to more easily illustrate the various embodiments. Other values of k, however, may be used for any of the features described herein.

Also for sake of simplicity, in the following discussion, a model with two independent variables, i.e., $y=f(x_1, x_2)$, will be used in examples. Thus, the partial inversions of this model may be expressed as $x_2 = f^{-1}(x_1, y)$ and $x_1 = f^{-1}(x_2, y)$.

Figure 6A:
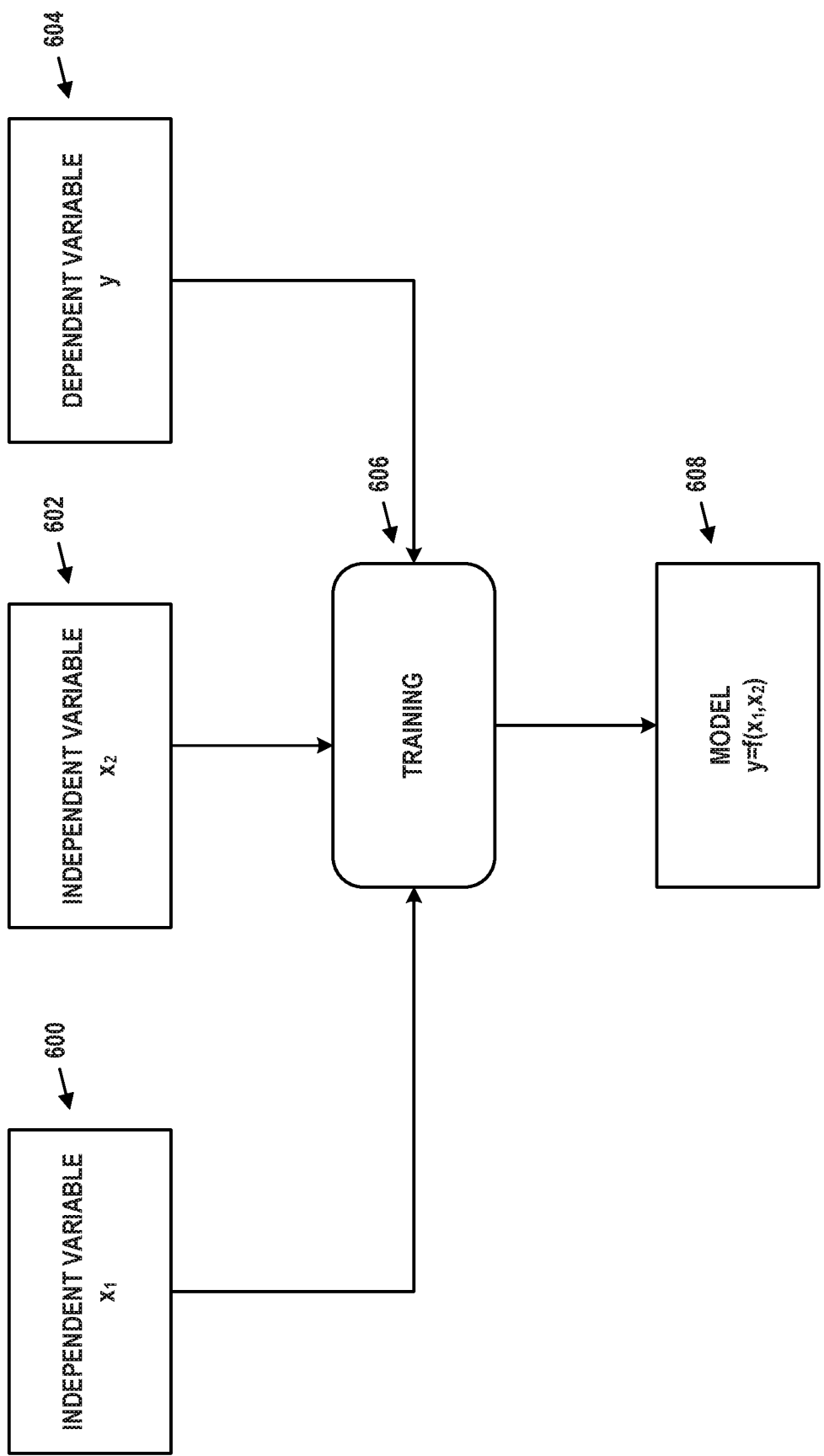
FIG. 6A depicts development of a machine learning model, in accordance with example embodiments.
Figure 6B:
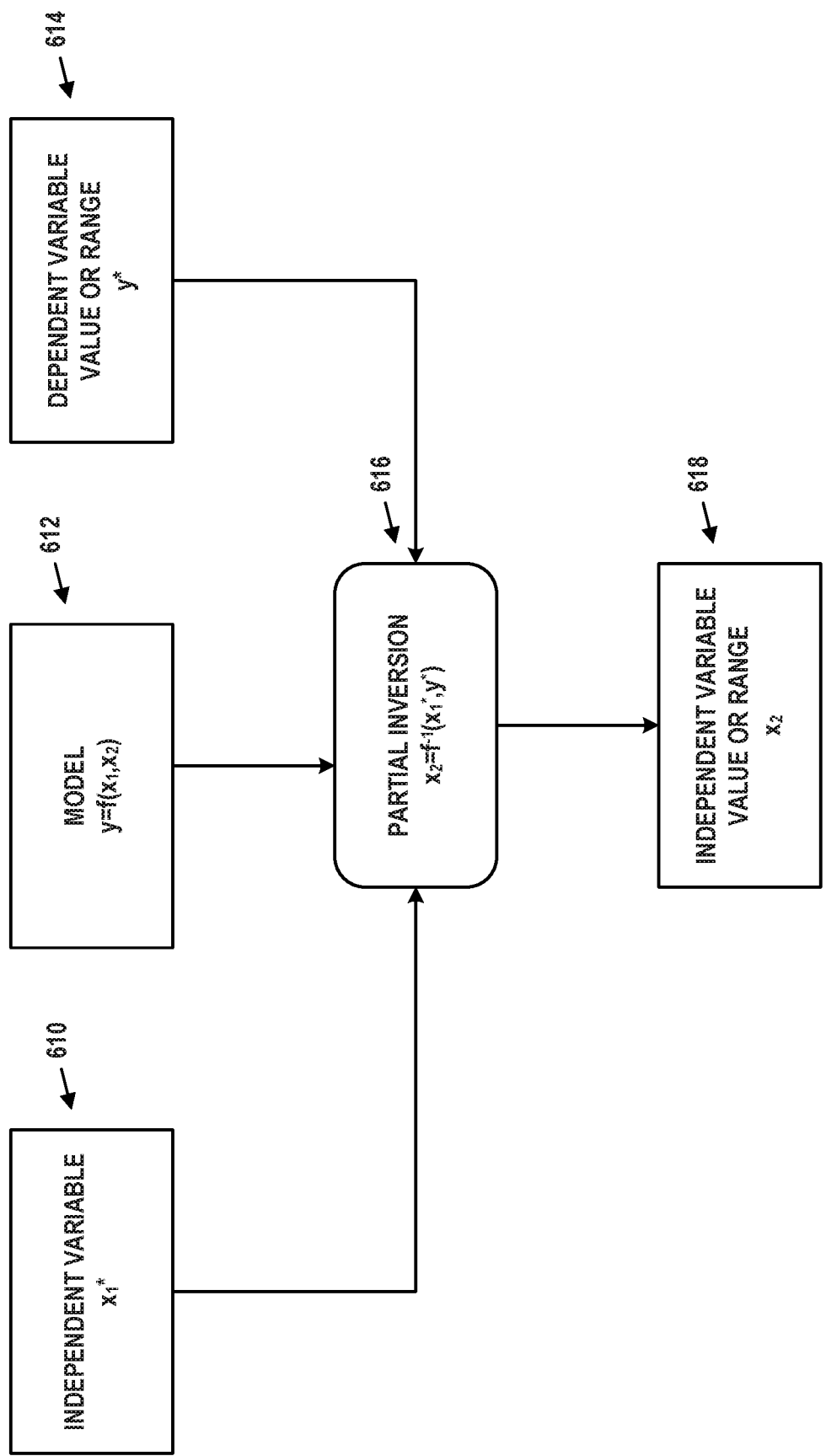
FIG. 6B depicts development of a partially inverted machine learning model, in accordance with example embodiments.
Figure 6C:
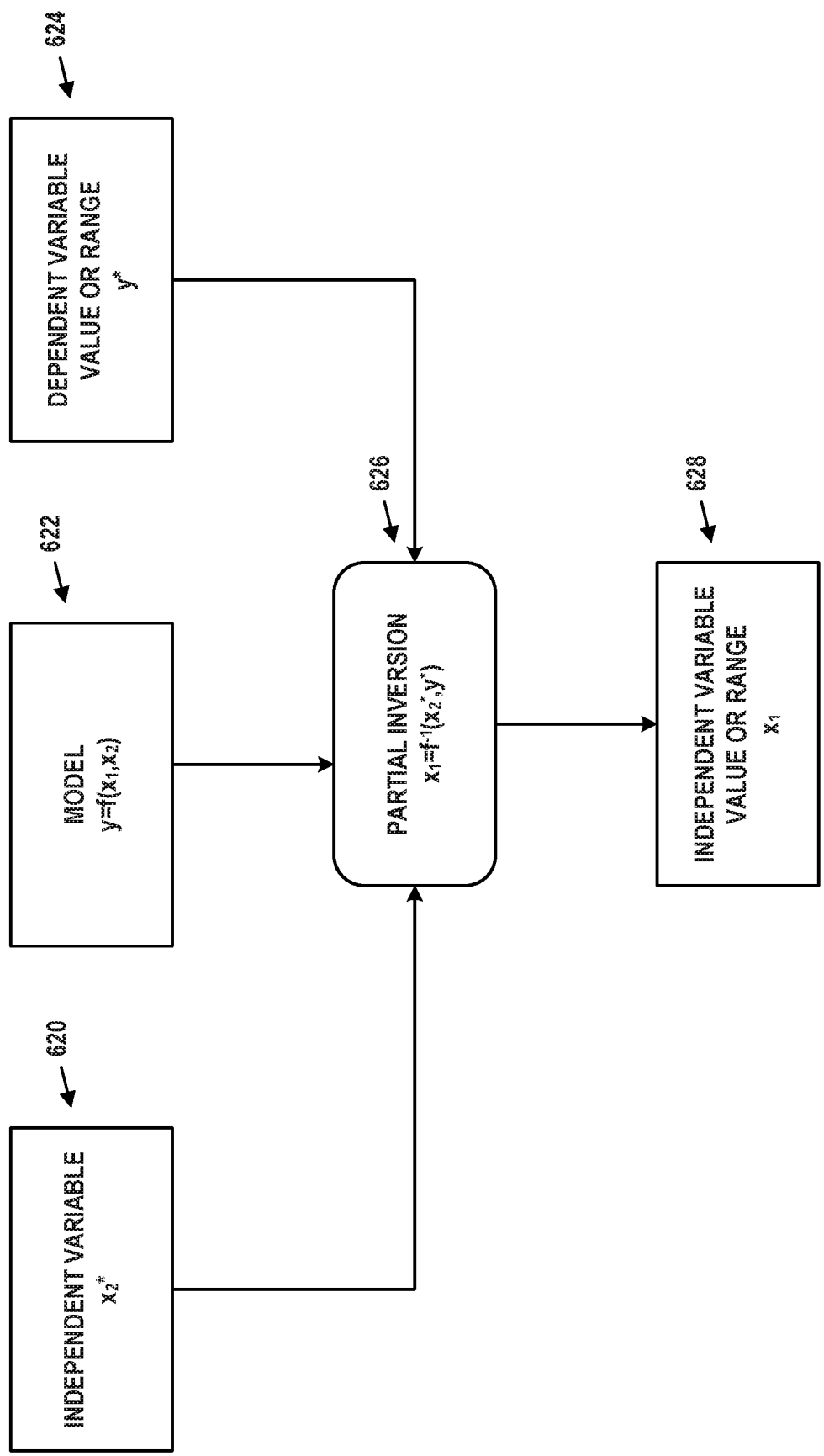
FIG. 6C depicts development of another partially inverted machine learning model, in accordance with example embodiments.

FIGS. 6A, 6B, and 6C illustrate the difference between a traditional machine learning model and the partial inversions thereof. In FIG. 6A, block 600 represents independent variable $x_1$, block 602 represents independent variable $x_2$, and block 604 represents dependent variable y. Block 606 represents training a machine learning model with associated values of $x_1$, $x_2$, and y. Block 608 represents the outcome of this training, the model $y=f(x_1, x_2)$.

FIG. 6B represents a partial inversion of the model in order to identify values of independent variable $x_2$ that, when the value of independent variable $x_1$ is fixed at $x_1^*$, produce a value or range of the dependent variable y specified by y*. Thus, block 610 represents independent variable $x_1$ fixed at $x_1^*$, block 612 represents the model $y=f(x_1, x_2)$, and block 614 represents y*. Block 616 represents carrying out a partial inversion of the model to solve for independent variable $x_2$. Block 618 represents the values of independent variable $x_2$ that satisfy the model as partially inverted under the specified constraints.

Similarly, FIG. 6C represents a partial inversion of the model in order to identify values of independent variable $x_1$ that, when the value of independent variable $x_2$ is fixed at $x_2^*$, produce a value or range of the dependent variable y specified by y*. Thus, block 620 represents independent variable $x_2$ fixed at $x_2^*$, block 622 represents the model $y=f(x_1, x_2)$, and block 624 represents y*. Block 626 represents carrying out a partial inversion of the model to solve for independent variable $x_1$. Block 628 represents the values of independent variable $x_1$ that satisfy the model as partially inverted under the specified constraints.

Figure 7:
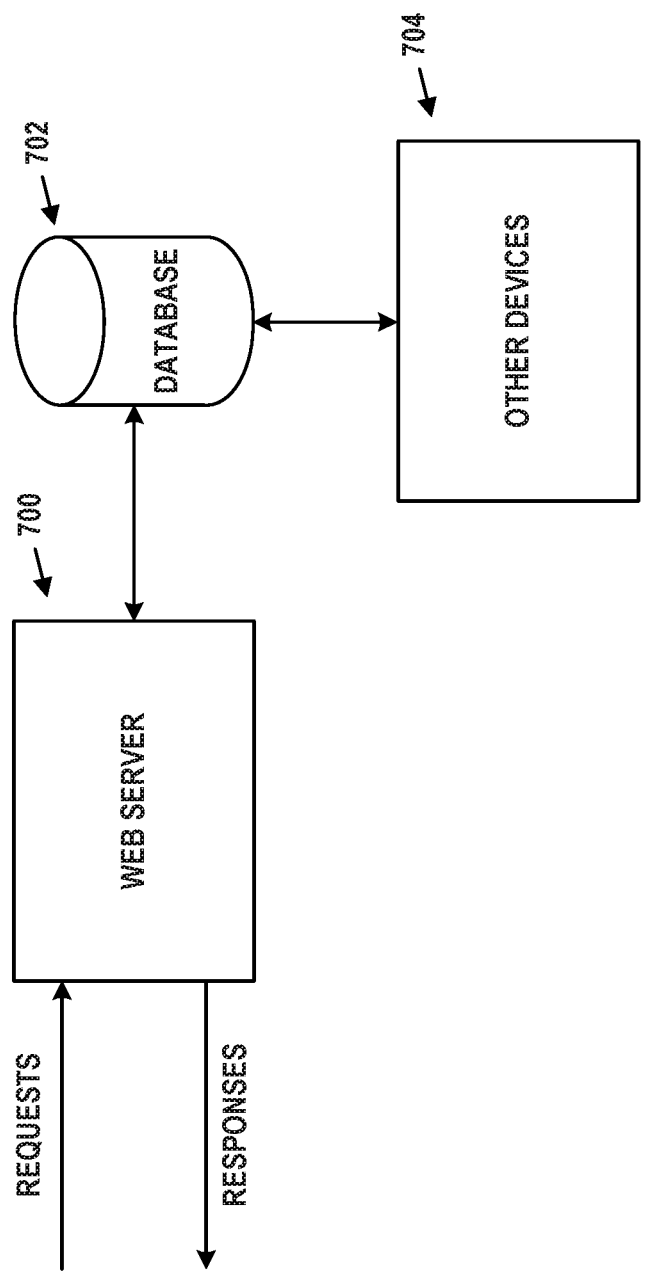
FIG. 7 depicts an example networked environment for employing a partially inverted machine learning model, in accordance with example embodiments.

To further illustrate partial inversion, the example of FIG. 7 and Table 1 will be used. In FIG. 7, database 702 stores content accessible to web server 700. This content may include dynamic content that is displayed or otherwise processed by web server 700. For instance, if a web page provided by web server 700 contains a list of IT trouble tickets (i.e., problems reported by users of IT systems), the details of each trouble ticket may be stored in database 700. Thus, when a web request arrives at web server 700, web server 700 may process this request by determining static content for the web page, and retrieving dynamic content from database 702. This may involve web server 700 executing one or more scripts or commands. Then, web server 700 may construct a web page from the static and dynamic content, and transmit a representation of this web page in a response.

In addition to serving web server 700, database 702 may also serve other devices 704. Other devices 704 may be other web servers or other types of devices or systems that utilize database 702. Therefore, the load on database 702 may come from sources other than just web server 700.

Each of web server 700, database 702, and other devices 704, as well as any software applications operating thereon, may be represented as configuration items in a CMDB. Such representations may also include indications of measurable KPIs associated with these devices, such as the processor utilization of database 702 and the incoming web requests per second of web server 700.

TABLE 1

| | | Database Processor Utilization ($x_2$) | | | | | | | | |
|---|---|---|---|---|---|---|---|---|---|---|
| | | 10% | 20% | 30% | 40% | 50% | 60% | 70% | 80% | 90% |
| Incoming Web Requests ($x_1$) | 0/sec | 0% | 0% | 0% | 0% | 0% | 0% | 0% | 0% | 0% |
| | 25/sec | 0% | 0% | 0% | 0% | 0% | 0% | 0% | 0% | 2% |
| | 50/sec | 0% | 0% | 0% | 0% | 0% | 0% | 0% | 1% | 5% |
| | 75/sec | 0% | 0% | 0% | 0% | 0% | 1% | 2% | 4% | 17% |
| | 100/sec | 0% | 0% | 1% | 2% | 5% | 10% | 31% | 56% | 78% |
| | 125/sec | 0% | 1% | 2% | 2% | 7% | 26% | 87% | 97% | 99% |
| | 150/sec | 0% | 2% | 4% | 5% | 16% | 40% | 99% | 99% | 99% |

Table 1 depicts independent variables from the system of FIG. 7. These are incoming web requests to web server 700 ($x_1$), measured in requests per second, and processor utilization of database 702 ($x_2$), measured as a percent. These measurements may be carried out in various ways. For instance, web server 700 may periodically, or from time to time, write the number of its incoming web requests per second to a file or to a memory location. Similarly, database 702 may periodically, or from time to time, write its processor utilization to a file or a memory location. A computing device within a managed network or within a remote network management platform may retrieve this data. For example, the computing device may be able to log on to web server 700 and/or database 702 (e.g., using SSH, HTTP, or the File Transfer Protocol (FTP)) and read the file. Alternatively or additionally, the computing device may be able to access the values written in the memory locations by way of SNMP, an HTTP transaction, or some other mechanism.

The dependent variable, y, is the likelihood (rounded to the nearest whole-number percent) that there will be an outage at web server 700 given various combinations of $x_1$ and $x_2$. The values of y may be based on historical data, perhaps measurements or observations of previous system behavior.

For example, when there are 100 incoming web requests per second at web server 700 for an hour while the processor utilization of database 702 is 60%, there is a 10% likelihood that web server 700 will suffer an outage. Similarly, when there are 125 incoming web requests per second at web server 700 for an hour while the processor utilization of database 702 is 80%, there is a 97% likelihood that web server 700 will suffer an outage.

An outage may be caused by various factors. For instance, web server 700 might be implemented in a fashion that does not allow it to shed load, and instead it attempts to queue all incoming requests. If the average number of such arriving requests exceeds the ability of web server 700 to serve these requests (which would likely be the case if the processor of database 702 is heavily loaded), then web server 700 may run out of free memory. This could cause web applications and/or related applications on web server 700 to crash or otherwise become inactive, resulting in an outage for web server 700.

The transition between web server 700 being in a stable state to being in an unstable state (in which an outage is likely) can be abrupt. For instance, when the processor utilization of database 702 is 70%, incoming requests to web server 700 can be up to 75 per second without resulting in the likelihood of an outage being greater than 2%. If the amount of incoming requests reaches 100 per second, the likelihood of an outage jumps to 31%. As a consequence, it is desirable to keep the number of requests per second below 75 when the processor utilization is at or around 70%.

Operationally, the data in Table 1 may be used to generate alerts, alarms, and/or warnings for system administrators. For instance, if the number of requests per second transitions to being above 75 when the processor utilization is at or around 70%, an alert may be sent to one or more system administrators. The alert may take the form of an email, text message, phone call, etc., and may include a description of the problem. Once alerted, a system administrator may take steps to reduce incoming requests to web server 700 (perhaps by steering some of these requests to another web server) or to reduce the processor utilization of database 702 (perhaps by switching some of other devices 704 to use a different database).

B. Carrying Out a Partial Inversion

The complexity of carrying out a partial inversion may be based on the structure of the underlying model, as well as constraints that may be imposed on values of the independent and dependent variables. For instance, if the model $f$ is linear and expressed in closed form, and there are no constraints on $x_1$, $x_2$, or y, then inversions of this closed form equation can be used to solve for $x_1$ and $x_2$, respectively. On the other hand, if $f$ is non-linear and/or no closed form expression is used, the sought-after independent variable can be found through a search process.

Assuming that $x_1$ is the sought-after independent variable, the value of $x_2$ is fixed at $x_2^*$, and that the dependent variable has a target value of $y^T$, values of $x_1$ that are within any pertinent constraints thereof may be obtained. Then, values of the dependent variable may be calculated using the fixed value $x_2^*$ with each of these values of $x_1$. This can be expressed as $\hat{y}=f(x_1,x_2^*)$. The values of $\hat{y}$ may then be compared to $y^T$ to determine the values of $x_1$ that best satisfy the function. This process may be repeated until one or more values of $x_1$ are found that produce values of $\hat{y}$ within a pre-established threshold of $y^T$ or another stopping condition is met (e.g., a maximum number of values are tested).

This pre-established threshold may be dependent on the range of values relevant for y and perhaps other factors as well. For instance, if y can take on values between 1 and 10 and $y^T$ is 5, then values of $x_1$ that produce a $\hat{y}$ between 4 and 6 may be accepted. In alternative embodiments, values of $x_1$ that produce a $\hat{y}$ within a percentage of $y^T$ may be accepted. The exact percentage may vary with the problem being solved and the constraints on the variables, but may take on values such as 1%, 2%, 5%, 10%, 20%, and so on.

There are two main ways of determining acceptable values of the unfixed dependent variable when carrying out a partial inversion: simulation and optimization. Each is discussed in turn below.

Simulation involves selecting a series of values for $x_1$ and calculating the $\hat{y}$ value for each until one or more are found to be within a pre-established threshold of $y^T$ or another stopping condition is met. These values may be selected randomly (e.g., 100 values distributed evenly across the range of $x_1$). Alternatively, a more intelligent technique, such as binary search, hill climbing, or simulated annealing, may be used. In some cases, values of $x_1$ may be based on the data used to train the machine learning model, $f$.

Turning back to Table 1, if the value of $x_2$* (database processor utilization) in that example is fixed at 70%, a goal may be to determine what values of $x_1$ (incoming web requests) will result in a likelihood of an outage of less than 5%. Thus, $y^T$ is 5. Since values of y jump from 2 to 31 as $x_1$ increases from 75 per second to 100 per second, a binary search of $x_1$ values in this range may be carried out to determine a $\hat{y}$ value within, for instance, 0.25 of $y^T$. Suppose that when $x_1$ is 83, 9 is 4.9. Then 83 may be returned as the result of the partial inversion, and the system may monitor the number of incoming web requests per second, alerting the system administrator when this values exceeds 83 or is trending towards 83. This technique can also be used to identify a range of independent variable values that produce a target range of dependent variable values.

While simulation works well in general, it may require selection of a large number of values for the fixed independent variable before an appropriate result is found. In some cases, dozens, hundreds, or thousands of attempts may be made. For complex systems with a large number of independent variables, this process may be repeated for many of these independent variables, further increasing the time required to obtain results.

As an alternative, the partial inversion may be framed as a constrained non-linear optimization problem. In this case, the goal of the optimization problem is to find $x_1$* such that:

$$x_1^* = \underset{x_1}{\operatorname{argmin}} (\hat{y} - y^T)^2 \text{ subject to: } \hat{y} = f(x_1, x_2^*)$$

This expression represents the value of $x_1$ that minimizes the squared difference between the resulting value of $\hat{y}=f(x_1, x_2)$ and the target value $y^T$. Any constraints on values of $x_1$ and $x_2$ should be taken into account.

In order to find appropriate values of $x_1$*, a non-linear solver software application may be used. Given a relationship between input and output values, described by $f$, the solver generates and selects a "best" solution from some set of available solutions. To do this, the solver may systematically choose values of $x_1$ from within an allowed set, computing $\hat{y}=f(x_1,x_2^*)$, and recording the "best" values of $\hat{y}$ found during the process. The criteria for evaluating which output values are best is to minimize $(\hat{y}-y^T)^2$.

Unlike simulation, which involves "guessing" values of $x_1$ in a semi-systematic fashion, a solver may use more knowledge of $f$ when determining candidate values of $x_1$. For instance, in some cases, the solver may fit a closed-form function to $f$ and then solve this closed form function to find one or more values of $x_1$ that minimize $(\hat{y}-y^T)^2$. In general, the optimization approach may take less computation to execute, thus returning results more quickly. However, optimization might not be usable or practical on some data sets, such as those with noisy data and/or significant discontinuities.

It may be possible to combine aspects of simulation and optimization in order to obtain desired results. Further, the techniques herein can be used with any combination of continuous ranges, discontinuous ranges, integer values, real number values, alphanumeric values, symbolic values, Boolean values, and so on.

A possible further enhancement may be employed when the data in $x_1$ and $x_2$ are hierarchical in nature. For instance, if values of $x_1$ represent zip codes and the values of $x_2$ represent states in the U.S., then fixing the values of $x_2$ to one or more specific states constrains the possible values of $x_1$ to zip codes within those states. Thus, whether simulation or optimization is employed, the search space of $x_1$ can be constrained (in this case to only relevant zip codes) based on the fixed value of $x_2$.

C. Alternative Uses

The example discussed above relates to predicting an undesirable outcome or behavior of a system based on a partially-inverted machine learning model. This undesirable outcome may be an outage or crash involving software applications and computing devices in a managed network or a computational instance of a remote network management platform. But the embodiments herein are not limited to predictions of this nature, and may be used with any machine learning model that involves multiple independent variables.

For instance, the embodiments herein may be used to predict a desirable behavior, such as identifying the most likely method through which a user will back up his or her computer. It is well-known in the IT profession that many users fail to back up their computer's data on a regular basis. If the computer's storage mechanism crashes or otherwise become unavailable (e.g., the disk drive malfunctions and becomes unreadable) or if the computer is lost or stolen, the user may lose several days, weeks, or months of data. In some cases, this loss will cost the enterprise thousands of dollars in recovery costs, rework, and/or lost opportunities. While there are ways of automatically and silently backing up a user's computer, these mechanisms may require that the computer is logged in to the enterprise network and has a network connection of sufficient capacity. This might not be the case when the user is traveling or working remotely.

Incentivizing the user to manually back up his or her computer may be modeled using the techniques herein. For instance, one independent variable could be the user's department (e.g., engineering, HR, finance, IT, supply chain, sales, site service, management), another independent variable might be the user's rank within the organization (e.g., individual contribution, manager, director, executive, consultant), and a third independent variable might be the mechanism used to remind the user to initiate a backup (e.g., email, text message, voice call). The dependent variable may be the likelihood that a user in a particular department and of a particular rank will initiate the backup if they are reminded in a particular fashion.

The enterprise may gather data related to these independent and dependent variables. Once a sufficient amount of data is gathered, a machine learning model may be constructed, where the model predicts the values of the dependent variable given values of the independent variables. Since a user's department and rank are essentially fixed but the reminder mechanism can vary, the model may be partially inverted to determine which reminder mechanism has the highest likelihood of causing the user with a given department and rank to initiate the backup.

For example, it may be observed that individual contributors in engineering and IT will initiate a backup with roughly equal probability regardless of the type of reminder. On the other hand, any user in sales or at the rank of director or executive might be more likely to ignore email and text message reminders, but will respond more favorably to voice call reminders.

Once this data is gathered by way of the partial inversion, reminders with the highest likelihood of resulting in the user initiating a backup can be sent to individual users. In this way, the enterprise can reduce risk and potential cost.

D. Technical Improvements

The embodiments herein involve technical improvements to machine learning technology. Since machine learning inherently involves computers and artificial intelligence, these embodiments are improvements to computer technology, and through partial inversion they allow computers to carry out predictions otherwise unavailable. Furthermore, these embodiments may be used to improve technological processes, such as proactively detecting computer outages as described above.

In many of these embodiments, the partially-inverted machine learning model also requires computer implementation because it is arranged to make predictions regarding system behavior in real time. For instance, in the example of FIG. 7, the model may be consulted every minute or every few seconds in order to be able to predict outages before they actually happen. Thus, computer implementation of these embodiments is required for this reason as well.

VI. Example Operations

Figure 8:
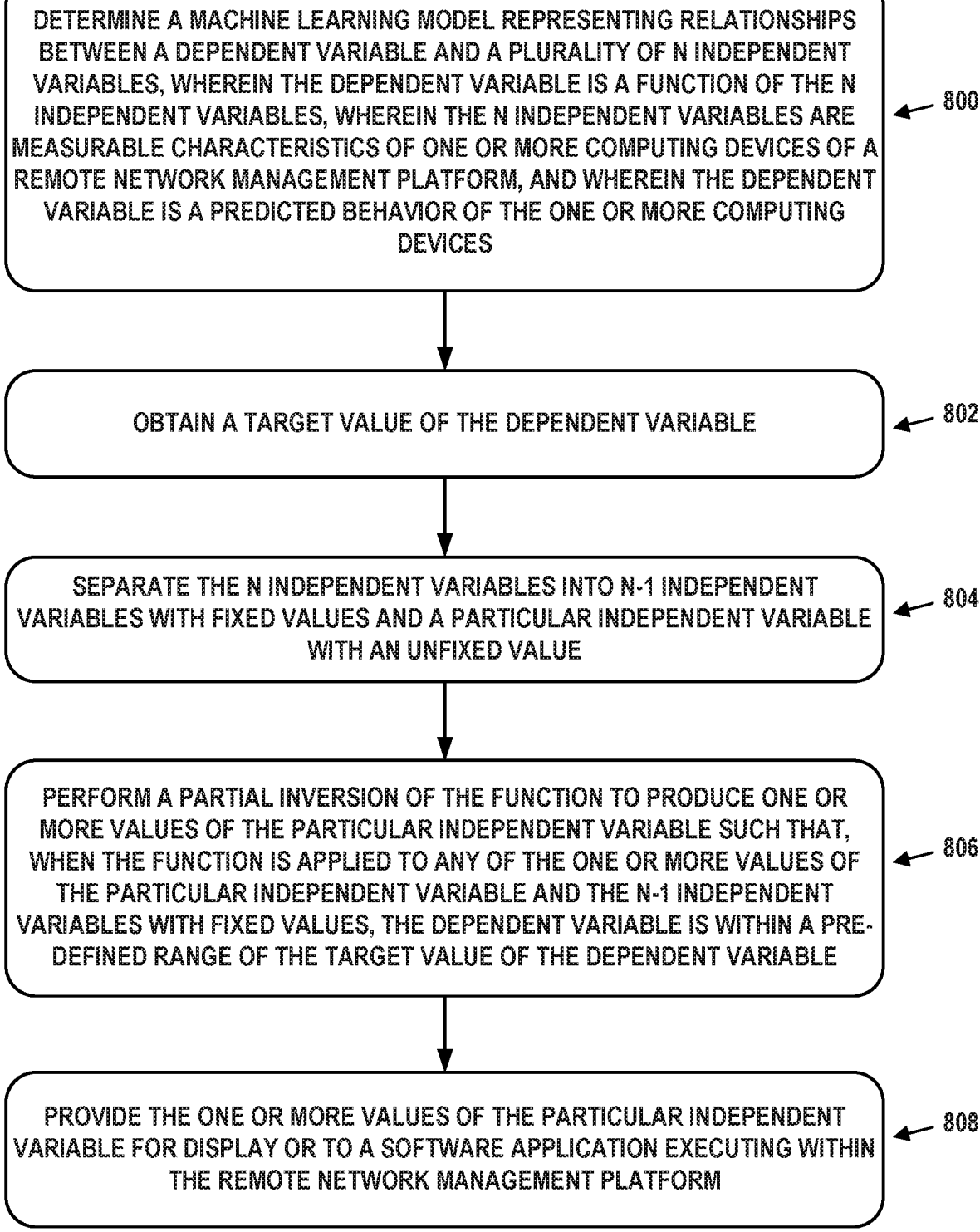
FIG. 8 is a flow chart, in accordance with example embodiments.

FIG. 8 is a flow chart illustrating an example embodiment. The process illustrated by FIG. 8 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 8 may be simplified by the removal of any one or more of the features shown therein. Further, these embodiments may be combined with features, aspects, and/or implementations of any of the previous figures or otherwise described herein.

Block 800 of FIG. 8 may involve determining a machine learning model representing relationships between a dependent variable and a plurality of n independent variables, where the dependent variable is a function of the n independent variables. The n independent variables may be measurable characteristics of one or more computing devices of a remote network management platform. The dependent variable may be a predicted behavior of the one or more computing devices. In some embodiments, the one or more computing devices may be disposed within a computational instance of the remote network management platform.

Block 802 may involve obtaining a target value of the dependent variable. Block 804 may involve separating the n independent variables into n−1 independent variables with fixed values and one particular independent variable with an unfixed value. As noted above, some embodiments may involve separating the n independent variables into n−k independent variables with fixed values and k independent variables with unfixed values.

Block 806 may involve performing a partial inversion of the function to produce one or more values of the particular independent variable such that, when the function is applied to any of the one or more values of the particular independent variable and the n−1 independent variables with fixed values, the dependent variable is within a pre-defined range of the target value of the dependent variable. When there are k independent variables with unfixed values, the same procedures apply except that values of each of these k variables are determined.

Block 808 may involve providing the one or more values of the particular independent variable for display or to a software application executing within the remote network management platform.

In some embodiments, performing the partial inversion of the function may involve: iteratively selecting a plurality of candidate values for the particular independent variable, evaluating each respective candidate value of the candidate values by applying the function to the respective candidate value and the n−1 independent variables with fixed values to obtain a respective output value, and selecting the one or more values of the particular independent variable with corresponding respective output values that are within the pre-defined range of the target value of the dependent variable.

In some embodiments, selecting the plurality of candidate values for the particular independent variable may involve: determining that applying the function with a particular candidate value and the n−1 independent variables with fixed values results in a particular output value that is within the pre-defined range of the target value of the dependent variable, and selecting at least one further candidate value to be closer to the particular candidate value than any other of the candidate values.

In some embodiments, evaluating each respective candidate value of the candidate values may involve determining the respective candidate values in accordance with a binary search over a range of the candidate values.

In some embodiments, selecting the plurality of candidate values for the particular independent variable may involve randomly selecting the plurality of candidate values.

In some embodiments, performing the partial inversion of the function may involve using a non-linear solver software application to determine the one or more values of the particular independent variable.

Some embodiments may further involve monitoring a measurable characteristic of the one or more computing devices corresponding to the particular independent variable. These embodiments may also involve: determining that the measurable characteristic of the one or more computing devices is within a threshold range of at least one of the one or more values of the particular independent variable, and generating and sending an alert related to the measurable characteristic. Generating and sending the alert related to the measurable characteristic may further involve transmitting the alert by way of email, voice call, or text message.

In some embodiments, the measurable characteristics of the one or more computing devices relate to processor utilization of the one or more computing devices, memory utilization of the one or more computing devices, or network traffic received by the one or more computing devices.

In some embodiments, the predicted behavior of the one or more computing devices is an outage or software application crash related to the one or more computing devices.

Some embodiments further involve: separating the n independent variables into a second set of n−1 independent variables with fixed values and a second particular independent variable with an unfixed value, and performing a partial inversion of the function to produce one or more values of the second particular independent variable such that, when the function is applied to any of the one or more values of the second particular independent variable and the second set of n−1 independent variables with fixed values, the dependent variable is within the pre-defined range of the target value of the dependent variable

VII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
one or more computing devices disposed within a computational instance of a remote network management platform, wherein the computational instance is dedicated to a remote network managed by the remote network management platform;
a machine learning model representing relationships between a dependent variable and a plurality of n independent variables, wherein the dependent variable is a function of the n independent variables, wherein the n independent variables are measurable characteristics of the one or more computing devices, and wherein the dependent variable is a predicted behavior of the one or more computing devices; and
a computing device including a processor and memory, wherein the computing device is disposed within the remote network management platform, and wherein execution, by the processor, of program instructions stored in the memory causes the computing device to perform operations comprising:
obtaining a target value of the dependent variable,
separating the n independent variables into n−1 independent variables with fixed values and a particular independent variable with an unfixed value,
performing a partial inversion of the function to produce one or more values of the particular independent variable such that, when the function is applied to any of the one or more values of the particular independent variable and the n−1 independent variables with fixed values, the dependent variable is within a pre-defined range of the target value of the dependent variable, wherein performing the partial inversion to produce the one or more values of the particular independent variable comprises:
selecting a series of candidate values of the particular independent variable; and
outputting one or more of the series of candidate values of the particular independent variable that, when applied as inputs to the function along with the fixed value of the n−1 independent variables, produces a respective output value of the dependent variable falling within the pre-defined range of the target value of the dependent variable; and providing the one or more outputted candidate values of the particular independent variable for display or to another software application executing within the remote network management platform.

2. The system of claim 1, wherein selecting the series of candidate values for the particular independent variable comprises:
determining that applying the function with a particular candidate value and the n−1 independent variables with fixed values results in a particular output value that is within the pre-defined range of the target value of the dependent variable; and
selecting at least one further candidate value to be closer to the particular candidate value than any other of the candidate values.

3. The system of claim 1, wherein evaluating each respective candidate value of the series of candidate values comprises:
determining the respective candidate values in accordance with a binary search over a range of the series of candidate values.

4. The system of claim 1, wherein selecting the series of candidate values for the particular independent variable comprises:
randomly selecting the series of candidate values.

5. The system of claim 1, wherein performing the partial inversion of the function comprises:
using a non-linear solver software application to determine the one or more values of the particular independent variable.

6. The system of claim 1, wherein the operations comprise:
monitoring a measurable characteristic of the one or more computing devices corresponding to the particular independent variable.

7. The system of claim 6, wherein the operations comprise:
determining that the measurable characteristic of the one or more computing devices is within a threshold range of at least one of the one or more values of the particular independent variable; and
generating and sending an alert related to the measurable characteristic.

8. The system of claim 7, wherein generating and sending the alert related to the measurable characteristic comprises:
transmitting the alert by way of email, voice call, or text message.

9. The system of claim 1, wherein the measurable characteristics of the one or more computing devices relate to processor utilization of the one or more computing devices, memory utilization of the one or more computing devices, or network traffic received by the one or more computing devices.

10. The system of claim 1, wherein the predicted behavior of the one or more computing devices is an outage or software application crash related to the one or more computing devices.

11. The system of claim 1, wherein the operations comprise:
separating the n independent variables into a second set of n−1 independent variables with fixed values and a second particular independent variable with an unfixed value; and
performing a second partial inversion of the function to produce one or more values of the second particular independent variable such that, when the function is applied to any of the one or more values of the second particular independent variable and the second set of n−1 independent variables with fixed values, the dependent variable is within the pre-defined range of the target value of the dependent variable.

12. A method comprising:
determining, by a computing system, a machine learning model representing relationships between a dependent variable and a plurality of n independent variables, wherein the dependent variable is a function of the n independent variables, wherein the n independent variables are measurable characteristics of one or more computing devices of a remote network management platform, and wherein the dependent variable is a predicted behavior of the one or more computing devices;
obtaining, by the computing system, a target value of the dependent variable;
separating, by the computing system, the n independent variables into n−1 independent variables with fixed values and a particular independent variable with an unfixed value;
performing, by the computing system, a partial inversion of the function to produce one or more values of the particular independent variable such that, when the function is applied to any of the one or more values of the particular independent variable and the n−1 independent variables with fixed values, the dependent variable is within a pre-defined range of the target value of the dependent variable, wherein performing the partial inversion of the function comprises:
iteratively selecting a plurality of candidate values for the particular independent variable;
evaluating each respective candidate value of the candidate values by applying the function to the respective candidate value and the n−1 independent variables with fixed values to obtain a respective output value; and
selecting the one or more values of the particular independent variable with corresponding respective output values that are within the pre-defined range of the target value of the dependent variable; and
providing, by the computing system, the one or more values of the particular independent variable for display or to a software application executing within the remote network management platform.

13. The method of claim 12, wherein selecting the plurality of candidate values for the particular independent variable comprises:
determining that applying the function with a particular candidate value and the n−1 independent variables with fixed values results in a particular output value that is within the pre-defined range of the target value of the dependent variable; and
selecting at least one further candidate value to be closer to the particular candidate value than any other of the candidate values.

14. The method of claim 12, wherein evaluating each respective candidate value of the candidate values comprises:
determining the respective candidate values in accordance with a binary search over a range of the candidate values.

15. The method of claim 12, wherein performing the partial inversion of the function comprises:
using a non-linear solver software application to determine the one or more values of the particular independent variable.

16. The method of claim 12, comprising:
monitoring a measurable characteristic of the one or more computing devices corresponding to the particular independent variable;
determining that the measurable characteristic of the one or more computing devices is within a threshold range of at least one of the one or more values of the particular independent variable; and
generating and sending an alert related to the measurable characteristic.

17. The method of claim 12, wherein the measurable characteristics of the one or more computing devices relate to processor utilization of the one or more computing devices, memory utilization of the one or more computing devices, or network traffic received by the one or more computing devices, and wherein the predicted behavior of the one or more computing devices is an outage or software application crash related to the one or more computing devices.

18. An article of manufacture including a non-transitory computer-readable medium, having stored thereon program instructions that, upon execution by a computing system, cause the computing system to perform operations comprising:
determining a machine learning model representing relationships between a dependent variable and a plurality of n independent variables, wherein the dependent variable is a function of the n independent variables, wherein the n independent variables are measurable characteristics of one or more computing devices of a remote network management platform, and wherein the dependent variable is a predicted behavior of the one or more computing devices;
obtaining a target value of the dependent variable;
separating the n independent variables into n−1 independent variables with fixed values and one particular independent variable with an unfixed value;
performing a partial inversion of the function to produce one or more values of the particular independent variable such that, when the function is applied to any of the one or more values of the particular independent variable and the n−1 independent variables with fixed values, the dependent variable is within a pre-defined range of the target value of the dependent variable, wherein performing the partial inversion of the function comprises:
iteratively selecting a plurality of candidate values for the particular independent variable;
evaluating each respective candidate value of the candidate values by applying the function to the respective candidate value and the n−1 independent variables with fixed values to obtain a respective output value; and
selecting the one or more values of the particular independent variable with corresponding respective output values that are within the pre-defined range of the target value of the dependent variable; and
providing the one or more values of the particular independent variable for display or to a software application executing within the remote network management platform.

19. The system of claim 1, wherein performing the partial inversion of the function comprises:
determining, for each of the series of candidate values of the particular independent variable, a respective output value of the series of candidate values of the particular independent variable;
determining the respective output value of the dependent variable when a fixed value of the n−1 independent variables and a candidate value of the particular independent variable are applied as inputs to the function; and
comparing the respective output value of the dependent variable to the target value of the dependent variable.

* * * * *